United States Patent
Nance (10) Patent No.: US 10,603,616 B1
(45) Date of Patent: Mar. 31, 2020

(54) REUSABLE FILTER FRAME

(71) Applicant: American Air Filter Company, Inc., Louisville, KY (US)

(72) Inventor: Nathaniel Nance, LaGrange, KY (US)

(73) Assignee: AMERICAN AIR FILTER COMPANY, INC., Louisville, KY (US)

( * ) Notice: Subject to any disclaimer, the term of this patent is extended or adjusted under 35 U.S.C. 154(b) by 104 days.

(21) Appl. No.: 15/685,572

(22) Filed: Aug. 24, 2017

(51) Int. Cl.
*B01D 46/00* (2006.01)
*B01D 46/52* (2006.01)

(52) U.S. Cl.
CPC ....... *B01D 46/0005* (2013.01); *B01D 46/008* (2013.01); *B01D 46/521* (2013.01)

(58) Field of Classification Search
CPC .............. B01D 46/521; B01D 46/0032; B01D 46/0028; B01D 46/0036; B01D 46/002; B01D 46/0013; B01D 2267/30; B01D 46/0005; B01D 46/008; Y10S 55/05; Y10S 55/31
USPC ....... 55/385.1, 495, 501, 511, DIG. 31, 483, 55/484, 497, 499, 502, DIG. 5; 95/273, 95/286
See application file for complete search history.

(56) References Cited

U.S. PATENT DOCUMENTS

| | | | | |
|---|---|---|---|---|
| 5,399,180 A | * | 3/1995 | Kopp | B01D 46/0006 210/445 |
| 5,935,282 A | * | 8/1999 | Lin | B01D 46/0004 55/385.6 |
| 6,397,842 B1 | | 6/2002 | Lee | |
| 6,723,148 B2 | | 4/2004 | Stass | |
| 6,843,820 B2 | * | 1/2005 | Kubokawa | B01D 46/0005 55/495 |
| 6,955,702 B2 | * | 10/2005 | Kubokawa | B01D 46/0005 55/357 |
| 7,097,692 B2 | * | 8/2006 | Southland | B01D 46/0001 156/60 |
| 7,320,719 B2 | | 1/2008 | Van de Graaf et al. | |
| 7,442,222 B2 | * | 10/2008 | Dworatzek | B01D 46/0001 220/293 |
| 8,142,537 B2 | * | 3/2012 | Braithwaite | B01D 46/10 55/497 |
| 8,834,611 B1 | * | 9/2014 | Dimicelli | B01D 46/002 55/483 |

(Continued)

FOREIGN PATENT DOCUMENTS

| | | |
|---|---|---|
| DE | 102012012940 | 1/2014 |
| WO | WO 2016001036 A1 | 1/2016 |
| WO | WO 2016087385 A1 | 6/2016 |

OTHER PUBLICATIONS

Web Eco Filter Adjustable, 6 year; Home Improvements, www.Amazon.com. May 3, 2017.

(Continued)

*Primary Examiner* — Minh Chau T Pham
(74) *Attorney, Agent, or Firm* — Middleton Reutlinger (57) ABSTRACT

A filter frame that may be reusable with filler media replacements. The filter frame may include a frame section have a first sidewall and a second sidewall along the outer periphery. The first sidewall may be at a lager perimeter than the second sidewall. A locking mechanism may releasably secure two frame sections together. The filter frame may include a filter media contained between two frame sections.

18 Claims, 4 Drawing Sheets

(56) References Cited

U.S. PATENT DOCUMENTS

| | | |
|---|---|---|
| 9,463,404 B2 | 10/2016 | Rieger et al. |
| 2003/0111170 A1 | 6/2003 | Oohashi et al. |
| 2008/0053049 A1* | 3/2008 | Pfannenberg ...... B01D 46/0005 55/493 |
| 2010/0139225 A1 | 6/2010 | Mammerella et al. |
| 2010/0304232 A1 | 12/2010 | Huecker et al. |
| 2011/0100870 A1 | 5/2011 | Ohnuki et al. |
| 2013/0000489 A1* | 1/2013 | Lu ...................... B01D 46/0005 96/222 |
| 2015/0277373 A1* | 10/2015 | Yamaguchi ........ B01D 46/0002 55/495 |
| 2019/0145655 A1* | 5/2019 | Conrad ............. B01D 46/0005 165/119 |

OTHER PUBLICATIONS

Canadian Woodworking & Home Improvement, Festool CT26E Dust Extractor, www.canadianwoodworking.com. Jul. 2013.
The Best Air Purifier, Breathe a little easier, www.reviews.com. Dec. 12, 2016.

* cited by examiner

FIG. 4

REUSABLE FILTER FRAME

BACKGROUND

The present embodiments relate to a filter frame, with particular embodiments shown for a filter frame for use with filter media replacements.

Typical air filters may be positioned in an air filter housing of an air flow system. The entire air filter can be replaced when it becomes loaded with contaminants over time and the filtering performance decreases. However, disposing of the entire air filter may increase cost of replacement and/or increase waste. Thus, there is a need for one or more reusable filter frames allowing the user to replace the filter media while reducing waste, decreasing the cost to replace, achieving desired filtering effect, and/or lowering fabrication costs.

SUMMARY

In some embodiments of the invention, for example, a filter frame for use with a replaceable filter media may comprise an upstream frame section having a planar upstream member defining a plurality of upstream openings. In some embodiments, the planar upstream member may include a first sidewall and a second sidewall projecting downstream from the planar upstream member. In various embodiments, the second sidewall may be shorter than the first sidewall. In some embodiments, the filter frame may comprise a downstream frame section hawing a planar downstream member defining a plurality of downstream openings. In various embodiments, the planar downstream member includes a first sidewall and a second sidewall projecting upstream from the planar downstream member. In some embodiments, the second sidewall may be shorter than the first sidewall. Moreover, in various embodiments, the first sidewall of the upstream frame section may overlap the second sidewall of the downstream frame section in the direction of air flow from the planar upstream member towards the planar downstream member. In some embodiments, the second sidewall of the upstream frame section may overlap the first sidewall of the downstream frame section in the direction of air flow from the planar upstream member towards the planar downstream member.

In various embodiments, the filter frame may be in combination with a filter media, wherein the filter media may be contained with the upstream frame section and the downstream frame section. In some embodiments, the first sidewall of the upstream frame section may include detents and the second sidewall of the upstream frame section may include detent openings. In various embodiments, the upstream frame section may be the same as the downstream frame section. Moreover, in some embodiments, the first sidewall may be positioned at a larger perimeter than the second sidewall. In various embodiments, the upstream frame section may be rectangular in shape with an outer periphery including four sides, and in sequence about the outer periphery the first side includes the first sidewall, then the second side includes the first sidewall followed by the second sidewall, then the third side includes the second sidewall, and then the fourth side includes the second sidewall followed by the first sidewall. In some embodiments, the first sidewall of the upstream frame section may surround the second sidewall of the downstream frame section, and the first sidewall of the downstream frame section may surround the second sidewall of the upstream frame section.

In some embodiments, a filter frame for use with a replaceable filter media may comprise a rectangular frame section having a substantially planar member defining a plurality of openings within an outer periphery. In various embodiments, the frame section may include a first sidewall interconnected with a second sidewall projecting away from the planar member along the outer periphery of the planar member. Moreover, in some embodiments, the second sidewall may project less than the first sidewall away from the planar member. In some embodiments, the first sidewall may be positioned at a larger perimeter than the second sidewall, in various embodiments, a distal end of the first sidewall spaced away from the planar member may include detents and a proximal end of the second sidewall adjacent the planar member may include detent openings.

In various embodiments, the filter frame may include two frame sections, a first frame section and a second frame section. In some embodiments, the filter frame may be in combination with a filter media. In various embodiments, the filter media may be contained within the first frame section and the second frame section. In addition, in some embodiments, the first sidewall of the first frame section may surround the second sidewall of the second frame section, and the first sidewall of the second frame section may surround the second sidewall of the first frame section. In various embodiments, the detents of the first frame section play operably engage the detent openings of the second frame section, and the detents of the second frame section may operably engage the detent openings of the first frame section. In some embodiments, the outer periphery may include four sides, and in sequence about the outer periphery the first side includes the first sidewall, then the second side includes the first sidewall followed by the second sidewall, then the third side includes the second sidewall, and then the fourth side includes the second sidewall by the first sidewall. In various embodiments, opposing edges of the first sidewall adjacent the second sidewall may he angled away from the second sidewall creating an outwardly facing surface from the planar member. In addition, in some embodiments, the frame section may include an outwardly projecting flange outside the second sidewall adjacent the planar member.

Other embodiments may include the method of manufacturing a reusable filter frame for use with a replaceable filter media comprising the step of molding two substantially similar frame sections. In some embodiments, each frame section may be rectangular in shape. In some embodiments, each frame section may have a substantially planar member defining a plurality of openings within an outer periphery and a first sidewall interconnected with a second sidewall projecting away from the planar member along the outer periphery of the planar member. In various embodiments, the second sidewall may project less than the first sidewall away from the planar member. In some embodiments, the first sidewall may be positioned at a larger perimeter than the second sidewall. In various embodiments, the method may include assembling the two frame sections by reversing one frame section and rotating 180 degrees before combining together resulting in the first sidewall of each frame section surrounding the second sidewall of each other frame section, respectively.

In various embodiments, the method may include providing a filter media within the two frame sections before the step of assembling. In some embodiments, the method may include replacing the filter media. In various embodiments, the step of assembling the two frame sections may include the step of locking the two frame sections together. Moreover, in some embodiments, the step of locking the two frame sections may include engagement of a plurality of detents with a plurality of detent openings.

These and other advantages and features, which characterize the embodiments, are set forth in the claims annexed hereto and form a further part hereof. However, for a better understanding of the embodiments, and of the advantages and objectives attained through its use, reference should be made to the drawings and to the accompanying descriptive matter, in which there are described example embodiments. This summary is merely provided to introduce a selection of concepts that are further described below in the detailed description, and is not intended to identify key or essential features of the claimed subject matter, nor is it intended to be used to limit the scope of the claimed subject matter, nor to define the field of endeavor.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED .DESCRIPTION

Numerous variations and modifications will be apparent to one of ordinary skill in the art, as will become apparent from the description below. Therefore, the invention is not limited to the specific implementations discussed herein.

The embodiments discussed hereinafter will focus on the implementation of the hereinafter-described techniques for a filter frame 20, such as the type that may be used in a residential environment such as, but is not limited to, housing and apartments, or in other similar applications. However, it will be appreciated that the herein-described apparatus and techniques may also be used in connection with other types of filter holding systems in some embodiments. For example, the herein described apparatus and techniques may be used in commercial and/or agricultural applications in some embodiments. Moreover, the herein-described apparatus and techniques may be used in connection with a variety of filter configurations and/or characteristics.

Figure 1:
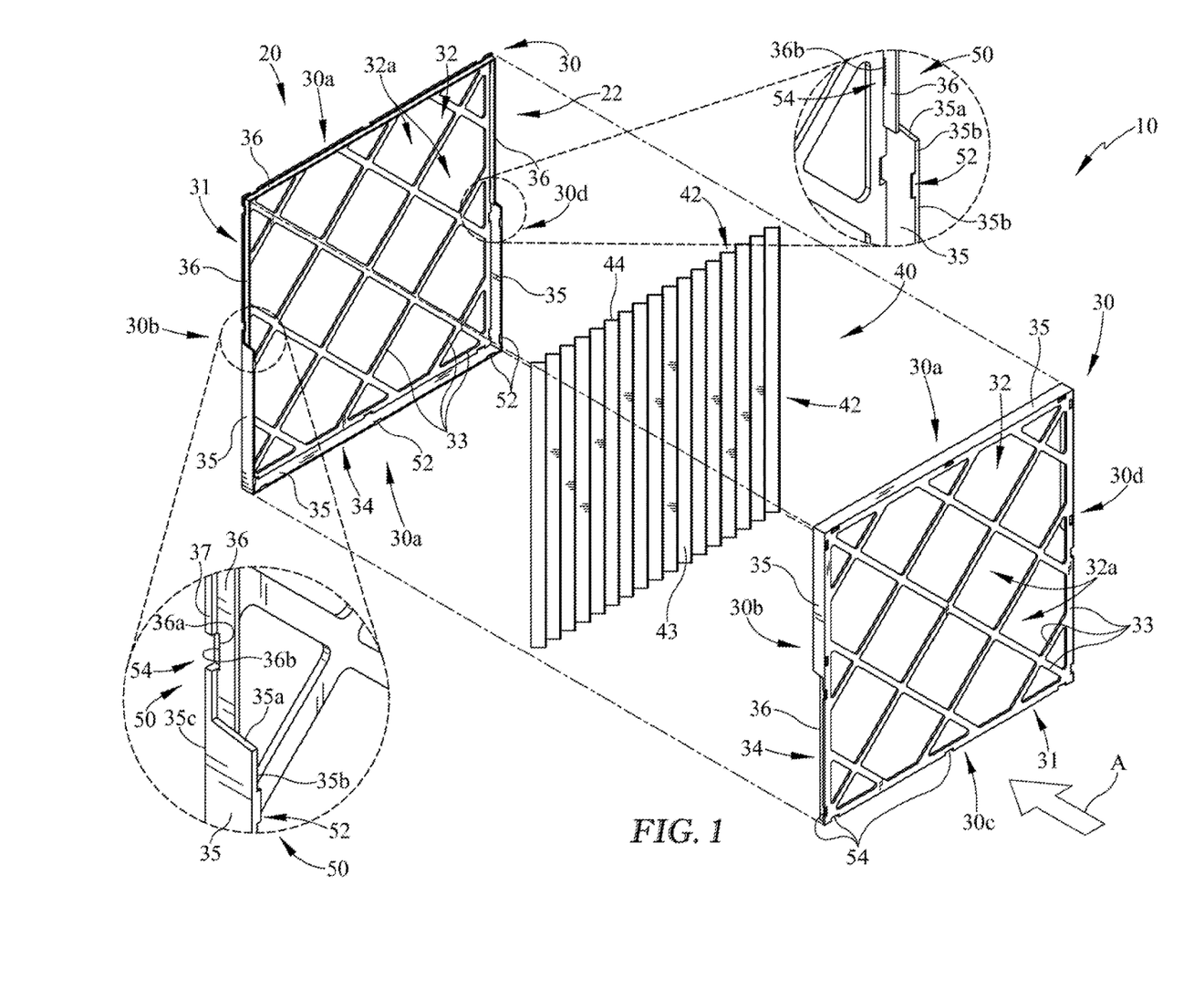
FIG. 1 is a perspective view of one embodiment of a filter frame exploded away from an embodiment of filter media.
Figure 2:
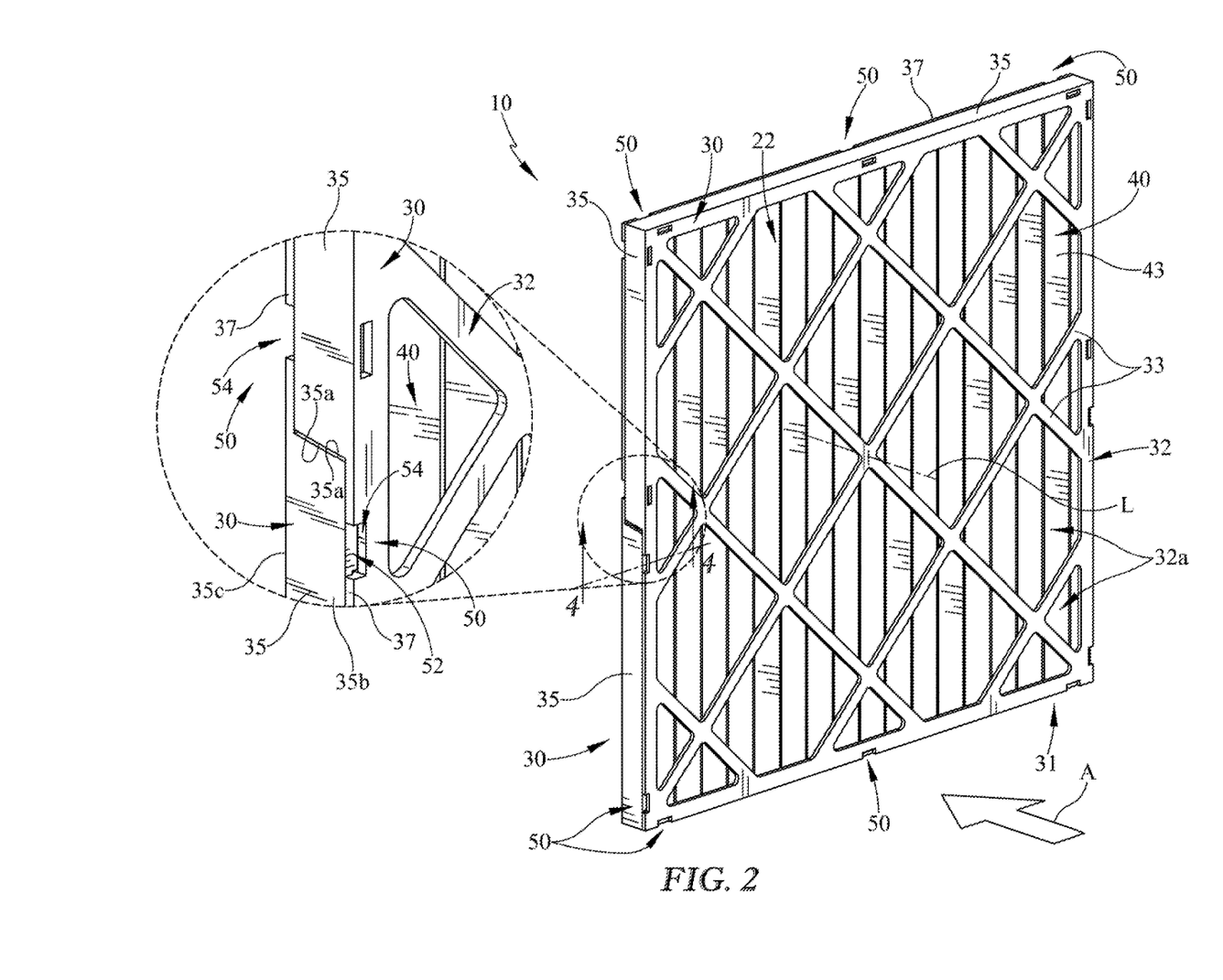
FIG. 2 is a perspective view of the filter frame of FIG. 1 illustrating an assembled upstream frame section and downstream frame section containing the filter media in the space defined therebetween.

Turning now to the drawings, wherein like numbers denote like parts throughout the several views, FIGS. 1 and 2 illustrate an example reusable filter frame 20 in which the various technologies and techniques described herein may be implemented. Filter frame 20 includes a frame section 30 that may be used both for the upstream and downstream sections in some embodiments. Although the frame sections 30 are shown as substantially similar or the same, it should be understood that the frame sections may not be identical in some embodiments. In the embodiment shown, the frame section 30 may be substantially rectangular in shape. In a preferred embodiment, the filter frame 20 is molded plastic material. However, a variety of suitable materials may be used. It should be understood that the frame section 30 may be a variety of constructions, materials, quantities, shapes, and sizes. When assembled, at least two frame sections 30 may combine to contain a replaceable filter media 40 for an air filter 10. One or more interior surfaces of one or more of the frame sections 30 may position the filter media 40 therebetween. An outer periphery 42 of the filter media in the embodiment shown is adjacent an outer periphery 31 of each of the frame sections 30 (e.g. upstream and downstream frame sections). Moreover, an upstream surface 43 of the filter media may be adjacent a planar member 32 of the upstream filter frame section 30 and a downstream surface 44 of the filter media may be adjacent the planar member 32 of the downstream filter frame section 30. The filter media 40 may be replaced, adjusted, repaired, and/or cleaned when the filter frame 20 is in a disassembled configuration (FIG. 1). It should be understood that the air filter 10 and/or filter media 40 may be a variety of constructions, quantities, shapes, and sizes and still be used within the scope of the invention. For example, the air filter 10 may include one or more gaskets (not shown) between the filter media 40 and the filter frame sections 30, between the filter frame sections 30, and/or included with the filter frame sections/media to engage the air flow system.

Figure 3:
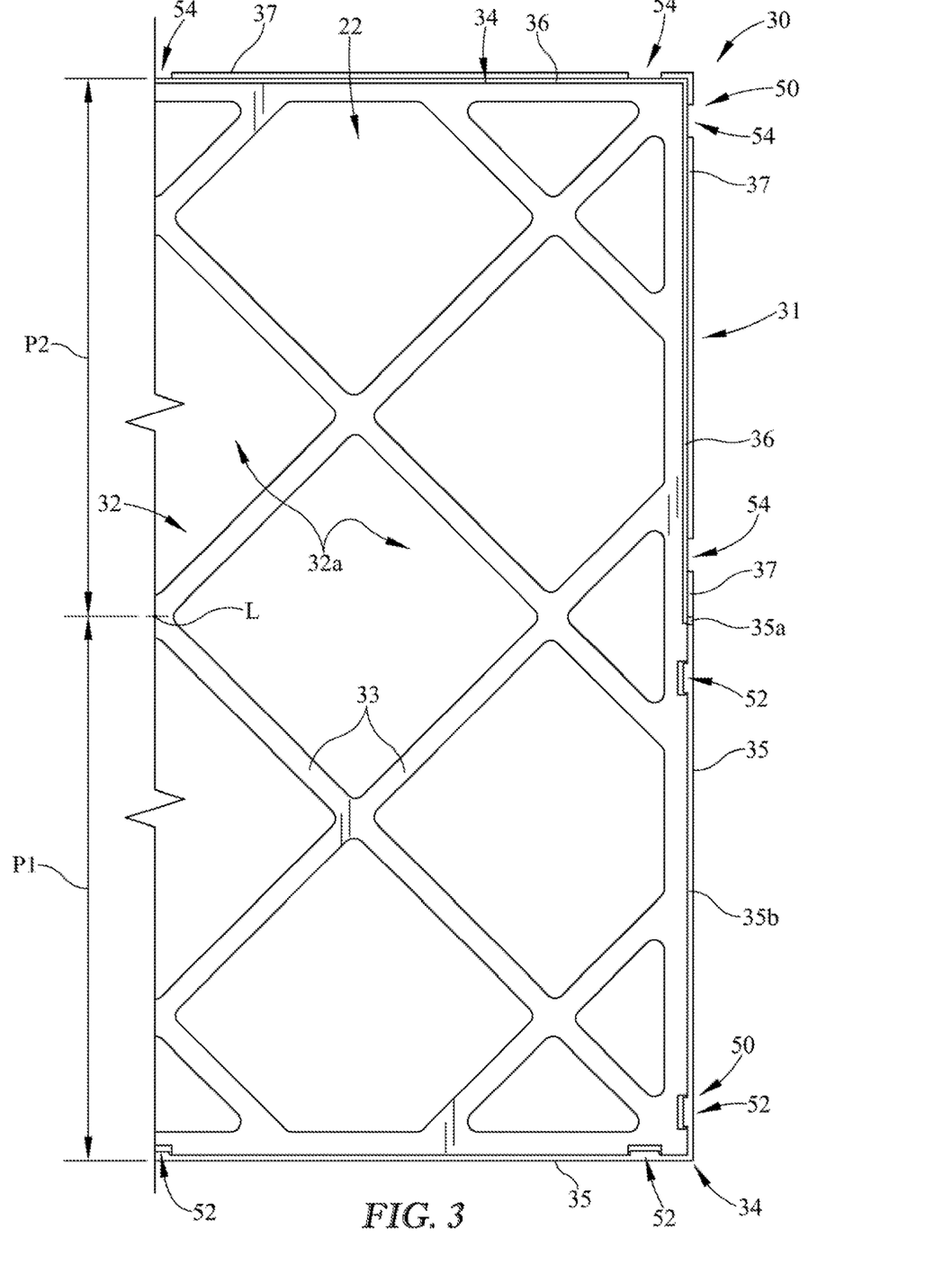
FIG. 3 is an inside view of a frame section of the filter frame of FIG. 1 illustrating one side of a mirror image of the frame section.

As shown in the Figures, the filter frame 20 may include filter frame sections 30 for filtering the air flow A of an air flow system. The filter frame 20 may include a first or upstream frame section 30 and a second or downstream frame section 30 when assembled to define a space 22 therebetween, with the space 22 receiving at least a portion of the filter media 40. For ease of description, a frame section 30 (e.g. first and/or second) will he described in more detail. The frame section 30 may include a substantially planar member or face 32 defining a plurality of openings 32a within the outer periphery 31. These frame section openings 32a may be upstream and/or downstream openings relative to the filter media 40. The planar member 32 may include one or more support structures or intersecting members 33 defining the one or more openings 32a. The frame section 30 may include a sidewall or skirt 34 extending along the outer periphery 31. The sidewall 34 projects inwardly towards the space 22 or projects away from the planar member 32. For example, the sidewall 34 may project downstream if the frame section 30 is upstream or may project upstream if the frame section 30 is downstream relative to the filter frame's orientation. Although the sidewall 34 is shown as continuous about the outer periphery 31 of the planar member 32 or frame section 30, the sidewall 34 may be discontinuous or intermittent in some embodiments. The sidewall 34 may include one or more portions that project away from the planar member 32, with one or more portions extending at varying distances therefrom. As shown in the embodiment, the frame section sidewall 34 may include a first sidewall 35 interconnected with a second sidewall 36 along the outer periphery 31. The first sidewall 35 may he positioned along on one side, portion, or half of the outer periphery 31 and the second sidewall 36 may be positioned along the other side, portion, or half of the outer periphery 31. The second sidewall 36 may be shorter in length or project less than the first sidewall 35 away from the planar member 32. Although not shown, it should he understood that the one or more second sidewalls 36 may he substantially equal in length to the one or more first sidewalls 35 in some embodiments. The first sidewall 35 may be positioned at a larger distance from the longitudinal or central axis L of the frame section 30 or a larger perimeter (P1) along the outer periphery 31 than the second sidewall 36 (P2). As shown FIG. 3, the perimeter P1 of the first sidewall 35 may he larger than the perimeter P2 of the second sidewall 36. As shown in the embodiment, the frame section 30 and/or planar member 32 may include an outwardly projecting flange 37 outside the second sidewall 36. The flange 37 may be adjacent the planar member 32 or substantially in the same plane as the planar member in some embodiments. In the embodiment shown, the first sidewall 35 includes opposing edges 35a adjacent the intersection with the second sidewall 36. The opposing edges 35a of the first sidewall 35 may be positioned transverse to the plane of the planar member 32. As shown, in the embodiment, the opposing edge 35a may be non-perpendicular to the planar member 32. The opposing edge 35a may be angled away (e.g. an obtuse angle) from the second sidewall 36 creating an upwardly facing, surface or receiving taper from the planar member 32 and/or flange 37.

As shown in FIGS. 1-4, the frame section 30 includes the outer periphery 31 with a sidewall 34 configuration. Each frame section 30 may include a rectangular shaped outer periphery 31 with four sides and correspondingly shaped sidewall 34. The sidewall 34 portions or sections may be positioned about the sides in a pattern as shown. The pattern of the interconnected first and second sidewall 35, 36 in sequence about the outer periphery 31 may be that the first side 30a of the frame section 30 may include the first sidewall 35, then the second side 30b may include the first sidewall 35 followed by the second sidewall 36, then the third side 30c may include the second sidewall 36, and then the fourth side 30d may include the second sidewall 36 followed by the first sidewall 35.

The filter frame 20 and/or one or more frame sections 30 may include a locking mechanism 50 securing the filter frame sections 30 together to position the filter media 40. It should be understood that a variety of locking mechanisms may be used to secure the filter frame sections together in an assembled position. In some embodiments, at least a portion of the locking mechanism 50 may be integral with one or more of the frame sections 30. However, the locking mechanism 50 may be not integral with one or more of the frame sections and may be for example be additional clips, fasteners, or additional latches. In the embodiment illustrated in FIGS. 1-4, the one or more frame sections 30 may include the locking mechanism 50 that temporarily locks or secures the two frame sections 30 together until the user separates to a disassembled configuration. One locking mechanism 50 embodiment may be a detent 52 and a detent opening 54 engagement to secure or lock the two frame sections 30 together. The frame section 30 may have a detent 52 and/or detent opening 54 that releasably or operably engages a corresponding detent opening 54 and/or detent 52 of the other frame section 30. As is illustrated in the Figures, each frame section 30 may include one or more detents 52 and/or one or more detent openings 54. The first sidewall 35 of the frame section 30 may include the plurality of detents 52. In some embodiments, the second sidewall may include the one or more detents. In various embodiments, the detents 52 may project inwardly from the interior surface of the first sidewall 35 adjacent a distal end 35b spaced away from the planar member 32 or opposite a proximal end 35c adjacent the planar member 32. In addition, in the embodiment shown, the second sidewall 36 of the frame section 30 may include the plurality of detent openings 54. The detent openings 54 may be positioned adjacent the planar member 32 or a proximal end 36a of the second sidewall 36 adjacent the planar member 32. In the embodiment shown, the detent opening 54 may extend from the exterior surface of the second sidewall 36 for a distance to create a ledge 36b such that the defeat engages. In the embodiment shown, the detent opening 54 may extend through the second sidewall 36. It should be understood that the locking mechanism, detents, and/or detent openings may be a variety of constructions, shapes, sizes, quantities, and/or positions within a frame section and still be within the scope of the inventions.

Figure 4:
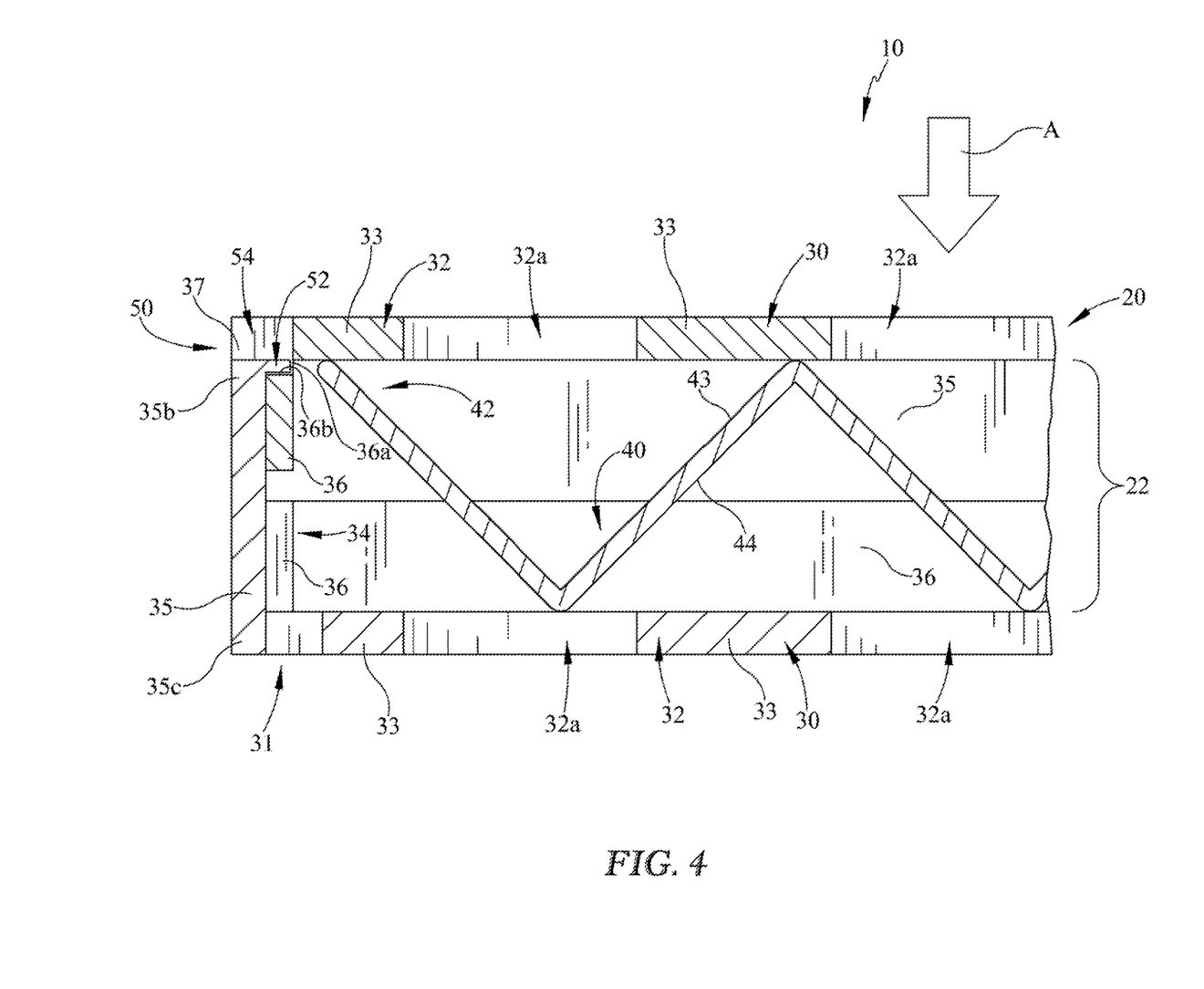
FIG. 4 is a sectional view taken along line 4-4 of FIG. 1.

As shown in FIGS. 1, 2, and 4, the first and second frame sections 30 are assembled to position the filter media 40. The first and second frame sections may engage each other in an overlapping engagement of the sidewalk 34 in the direction of air flow A, respectively. With the frame sections 30 having the sidewalk 34 (e.g. 35 and/or 36) facing towards each other, the frame sections may be slid or brought into overlapping engagement and/or an abutting engagement. When assembled, as shown in the embodiment, the first sidewall 35 at the larger perimeter P1 of each frame section 30 surrounds or is outside the second sidewall 36 at the smaller perimeter P2 of the other frame section 30. The first sidewall 35 of the first frame section 30 may overlap the second sidewall 36 of the second frame section 30 in the direction of air flow A. Moreover, the first sidewall 35 of the second frame section 30 may overlap the second sidewall 36 of the first frame section 30 in the direction of air flow A. In some embodiments, the overlapping engagement may be along the outer periphery 31 of the filter frame 20. This may be advantages to reduce air flow bypass. Also, as shown, the distal end 35b of each first sidewall 35 may engage the flange 37 outside and adjacent the second sidewall 36 of the other frame section 30 when assembled. Further, the outwardly facing surface of the opposing edges 35a of each first sidewall 35 may engage each other as shown in the enlarged view of FIG. 2. The available space as a result of the angled or tapered opposing edges 35a may allow for clearance and/or suitable alignment during assembly of the two frame sections 30. In some embodiments the overlap of the first sidewall 35 and the second sidewall 36 of each respective frame section 30 may be for a variety of distances. As shown in one embodiment, the first sidewall 35 of the first frame section 30 may overlap substantially the entire length of the projecting second sidewall 36 of the second frame section 30. With the second sidewall 36 smaller than the first sidewall 35, the overlap may allow for an easier assembly for the user and/or ensure a substantially complete assembly/abutment between the two frame sections. Moreover, although not shown, the first sidewall may overlap only a portion of the second sidewall of the other frame section.

When assembled as shown in FIGS. 2 and 4, the locking mechanism 50 may secure the two frame sections 30 to define the space 22. As illustrated, the detents 52 of the first frame section 30 operably engages the detent openings 54 of the second frame section 30 and the detents 52 of the second frame section 30 operably engages the detent openings 54 of the first frame section 30. During assembly, the detent 52 and/or first sidewall 35 of one or more of the frame sections cam over or slide along the outside surface of the second sidewall 36 until engagement with the detent opening 54. The first sidewall 35 may flex outwardly during the overlapping engagement with the second sidewall 36 until at least partial alignment of the detent 52 and the detent opening 54, resulting in the detent 52 and/or first sidewall 35 flexing inwardly into the engaged position with the detent opening 54. The first sidewall 35 may flex outwardly in some embodiments. The longitudinal separation of the two frame sections 30 along the direction of air flow A, or a variety of directions, may be reduced or prevented when the locking mechanism is engaged. The engagement may be released by sufficient opposing force to remove the detent 52 from the detent opening 54. Separation may be a result of the first sidewall 35 and/or detent 52 outwardly flexing and/or longitudinal separation. A variety of forces and directions may be applied to separate the frame sections 30. In some embodiments, the second and/or first sidewall may flex inwardly and/or outwardly to allow engagement and/or separation of the locking mechanism and/or frame sections.

In various embodiments, manufacturing may include molding the one or more frame sections. The frame section may be molded to provide two substantially similar frame sections. The frame sections do not have to be similar in some embodiments. With the two frame sections provided with similar positioned structure, the frame sections are orientated for alignment of the corresponding structure therebetween. The user and/or manufacture may assembly the air filter frame 20 with the filter media 40. With two frame sections molded, at least one frame section may be reversed/flipped and rotated 180 degrees to align the dissembled frame sections. In sonic embodiments, there may be a single orientation for assembly. One or more filter media elements may be inserted into one of the frame section and/or portion of the space before assembling the other frame section. Reducing the relative distance between the two frame sections, in at least this one or more orientations and/or directions (e.g. linear), may progressively overlap or engage the first sidewall with the second sidewall of each frame section, respectively. The step of assembly may include locking the two frame sections together. A variety of locking mechanisms may engage when the frame sections reach a relative position with each other and/or additional fasteners are used. In the embodiment shown, the one or more detents 52 may enter the one or more corresponding detent openings 54 and engage the ledge 36b thereby releasable securing their relative positon. The locking mechanism as shown may automatically engage. However, the locking mechanism may not automatically engage. Further in use, the one or more filter media may be, but is not limited to, replaced and/or cleaned by dissembling or separating the two frame members in a substantially opposite direction.

As shown in the Figures, the embodiment of the air filter is shown herein for ease of understanding. For example, the filter frame sections 30 may be combined with a variety of filter media to create a variety of air filters. The air filters remove contaminants such as dirt, dust, moisture, salt, carbon, viruses, and/or other contaminants from the air flowing therethrough that may tend to harm the desired environment. One or more filter frames 20 with a variety of filter media may be used in a variety of applications. Moreover, the filter media or elements may include a prefilter and a final filter in some embodiments. The filter media may be any suitable type, construction, or size. As shown in the embodiment, the filter media 40 may be pleated. Implementation of the herein-described apparatus and techniques within a variety of applications would be well within the abilities of one of ordinary skill in the art having the benefit of the instant disclosure, so the invention is not limited to the residential implementation discussed herein.

While several embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined, Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, he phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

It is to be understood that the embodiments are not limited in its application to the details of construction and the arrangement of components set forth in the description or illustrated in the drawings. The invention is capable of other embodiments and of being practiced or of being carried out in various ways. Unless limited otherwise, the terms "connected," "coupled," "in communication with," and "mounted," and variations thereof herein are used broadly and encompass direct and indirect connections, couplings, and mountings. In addition, the terms "connected" and "coupled" and variations thereof are not restricted to physical or mechanical connections or couplings.

The foregoing description of several embodiments of the invention has been presented for purposes of illustration. It is not intended to be exhaustive or to limit the invention to the precise steps and or forms disclosed, and obviously many modifications and variations are possible in light of the above teaching.

The invention claimed is:

1. A filter frame for use with a replaceable filter media comprising:
  an upstream frame section having an upstream frame section configuration of a planar upstream member defining a plurality of upstream openings, said planar upstream member includes a first sidewall and a second sidewall projecting downstream from said planar upstream member, wherein said second sidewall is shorter than said first sidewall, the upstream frame section first sidewall having a wider perimeter than the second sidewall;
  a downstream frame section having a downstream frame section configuration of a planar downstream member defining a plurality of downstream openings, said planar downstream member includes a first sidewall and a second sidewall projecting upstream from said planar downstream member, wherein said second sidewall is shorter than said first sidewall, the first downstream frame section sidewall having a wider perimeter than the second sidewall;
  wherein, the upstream frame section configuration and the downstream frame section configuration match each other;
  said first sidewall of said upstream frame section overlaps said second sidewall of said downstream frame section in the direction of air flow from said planar upstream member towards said planar downstream member by the perimeter of first sidewall of the upstream section being wider than the second sidewall of the downstream frame section thereby placing the first sidewall of the upstream section and the second sidewall of the downstream frame section being in overlapping side by side relationship in the direction of airflow; and
  said second sidewall of said upstream frame section overlaps said first sidewall of said downstream frame section in the direction of air flow from said planar upstream member towards said planar downstream member by the first sidewall of the downstream section being wider than the second sidewall of the upstream frame section thereby placing the first sidewall of the downstream section and the second sidewall of the upstream frame section being in overlapping side by side relationship in the direction of airflow;
  wherein the upstream frame section and the downstream frame section are the same construction and when joined together, the joined upstream frame section and downstream frame section substantially match the shape of a rectangular replaceable filter media and are operable to retain the replaceable filter media between the upstream frame section and the downstream frame section.

2. The filter frame of claim 1 in combination with the filter media, wherein said filter media is contained with said upstream frame section and said downstream frame section.

3. The filter frame of claim 1 wherein said first sidewall of said upstream frame section includes detents and said second sidewall of said upstream frame section includes detent openings.

4. The filter frame of claim 1 wherein said first sidewall is positioned at a larger perimeter than said second sidewall.

5. The filter frame of claim 1 wherein said upstream frame section is rectangular in shape with an outer periphery including four sides, and in sequence about said outer periphery said first side includes said first sidewall, then said second side includes said first sidewall followed by said second sidewall, then said third side includes said second sidewall, and then said fourth side includes said second sidewall followed by said first sidewall.

6. The filter frame of claim 1 wherein said first sidewall of said upstream frame section surrounds said second sidewall of said downstream frame section, and said first sidewall of said downstream frame section surrounds said second sidewall of said upstream frame section.

7. A filter frame for use with a replaceable filter media comprising:
  a first rectangular frame section having a substantially planar member defining a plurality of openings within an outer periphery, a first sidewall interconnected with a second sidewall projecting away from said planar member along said outer periphery of said planar member, wherein said second sidewall projects less than said first sidewall away from said planar member;

wherein said first sidewall is positioned at a larger perimeter than said second sidewall; and wherein a distal end of said first sidewall spaced away from said planar member includes detents and a proximal end of said second sidewall adjacent said planar member includes detent openings;

a second rectangular frame section having the same matching construction of the first rectangular frame section and joinable with said first rectangular frame section to retain a replaceable filter media between the first rectangular frame section and the second rectangular frame section, the first and the second rectangular frame section each having an inner surface facing each other when joined, the first rectangular frame section rotated 180 degrees relative to the second rectangular frame section when joined and overlapping the first sidewall of the first rectangular frame section with the second sidewall of the second rectangular frame section in the direction of airflow through the joined filter frame, and overlapping the first sidewall of the second rectangular frame section with the second sidewall of the first rectangular frame section in the direction of airflow through the joined filter frame.

8. The filter frame of claim 7 in combination with a filter media, wherein said filter media is contained within said first rectangular frame section and said second rectangular frame section.

9. The filter frame of claim 7 wherein said first sidewall of said first rectangular frame section surrounds said second sidewall of said second rectangular frame section, and said first sidewall of said second rectangular frame section surrounds said second sidewall of said first rectangular frame section.

10. The filter frame of claim 7 wherein said detents of said first rectangular frame section operably engages said detent openings of said second rectangular frame section, and said detents of said second rectangular frame section operably engages said detent openings of said first rectangular frame section.

11. The filter frame of claim 7 wherein said outer periphery including four sides, and in sequence about said outer periphery said first side includes said first sidewall, then said second side includes said first sidewall followed by said second sidewall, then said third side includes said second sidewall, and then said fourth side includes said second sidewall followed by said first sidewall.

12. The filter frame of claim 7 wherein opposing edges of said first sidewall adjacent said second sidewall are angled away from said second sidewall creating an outwardly facing surface from said planar member.

13. The filter frame of claim 7 wherein said frame section includes an outwardly projecting flange outside said second sidewall adjacent said planar member.

14. A method of manufacturing a reusable filter frame for use with a replaceable filter media comprising the steps of:

molding two of the same frame sections, wherein each said frame section is rectangular in shape, each said frame section has a substantially planar member defining a plurality of openings within an outer periphery and a first sidewall interconnected with a second sidewall projecting away from said planar member along said outer periphery of said planar member, wherein said second sidewall projects less than said first sidewall away from said planar member, and wherein said first sidewall is positioned at a larger perimeter than said second sidewall; and assembling said two frame sections by reversing one said frame section and rotating 180 degrees before combining together resulting in said first sidewall of each said frame section surrounding said second sidewall of each other said frame section, respectively.

15. The method of claim 14 further comprising the step of providing a filter media within said two frame sections before the step of assembling.

16. The method of claim 15 further comprising the step of replacing said filter media.

17. The method of claim 14 wherein the step of assembling the two frame sections includes the step of locking said two frame sections together.

18. The method of claim 17 wherein the step of locking said two frame sections includes engagement of a plurality of detents with a plurality of detent openings.

* * * * *

UNITED STATES PATENT AND TRADEMARK OFFICE
CERTIFICATE OF CORRECTION

| | | |
|---|---|---|
| PATENT NO. | : 10,603,616 B1 | Page 1 of 2 |
| APPLICATION NO. | : 15/685572 | |
| DATED | : March 31, 2020 | |
| INVENTOR(S) | : Nathaniel Nance | |

It is certified that error appears in the above-identified patent and that said Letters Patent is hereby corrected as shown below:

On the Title Page

In Column 2, item (57), under 'Abstract' Line 1, delete "filler", and insert -- filter --, therefor.

In Column 2, item (57), under 'Abstract' Line 2, after 'frame section' insert -- , --.

In Column 2, item (57), under 'Abstract' Line 4, delete "lager" and insert -- larger --, therefor.

In the Specification

In Column 1, Line 12, delete "cost" and insert -- the cost --, therefor.

In Column 1, Line 30, delete "hawing" and insert -- having --, therefor.

In Column 2, Line 11, delete "sidewall, in" and insert -- sidewall. In --, therefor.

In Column 2, Line 27, delete "play" and insert -- may --, therefor.

In Column 2, Line 36, delete "by" and insert -- followed by --, therefor.

In Column 2, Line 38, delete "he" and insert -- be --, therefor.

In Column 4, Line 33, delete "he" and insert -- be --, therefor.

In Column 4, Line 57, delete "he" and insert -- be --, therefor.

In Column 4, Line 62, delete "he" and insert -- be --, therefor.

In Column 4, Line 63, delete "he" and insert -- be --, therefor.

Signed and Sealed this
Eighteenth Day of August, 2020

Andrei Iancu
*Director of the United States Patent and Trademark Office*

CERTIFICATE OF CORRECTION (continued)
U.S. Pat. No. 10,603,616 B1

In Column 5, Line 2, delete "shown" and insert -- shown in --, therefor.

In Column 5, Line 3, delete "he" and insert -- be --, therefor.

In Column 5, Line 17, delete "facing," and insert -- facing --, therefor.

In Column 6, Line 3, delete "defeat" and insert -- detent --, therefor.

In Column 6, Line 13, delete "sidewalk" and insert -- sidewalls --, therefor.

In Column 6, Line 15, delete "sidewalk" and insert -- sidewalls --, therefor.

In Column 7, Line 22, delete "sonic" and insert -- some --, therefor.

In Column 7, Line 37, delete "releasable" and insert -- releasably --, therefor.

In Column 8, Line 35, delete "conjoined," and insert -- conjoined. --, therefor.

In Column 8, Line 62, delete "he," and insert -- the --, therefor.

In Column 9, Line 48, delete "and or" and insert -- and/or --, therefor.